United States Patent [19]

Vos

[11] 4,454,779

[45] Jun. 19, 1984

[54] DRIVE FOR A VARIABLE-STROKE SWASH PLATE MECHANISM

[75] Inventor: Jan Vos, Eindhoven, Netherlands

[73] Assignee: U.S. Philips Corporation, New York, N.Y.

[21] Appl. No.: 30,246

[22] Filed: Apr. 16, 1979

[30] Foreign Application Priority Data

May 2, 1978 [NL] Netherlands .................. 7804677

[51] Int. Cl.³ .............................................. F16H 23/00
[52] U.S. Cl. ........................................ 74/60; 92/12.2;
123/58 B
[58] Field of Search ................. 74/60, 839; 92/12.2;
123/58 A, 58 B; 417/222, 269

[56] References Cited

U.S. PATENT DOCUMENTS

| 925,148 | 6/1909 | Williams | 74/60 |
|---|---|---|---|
| 1,394,811 | 10/1921 | Daloz | 74/60 |
| 1,945,391 | 1/1934 | Benedek | 74/60 |
| 2,465,638 | 3/1949 | Eckert | 74/60 |
| 3,511,102 | 5/1970 | Brandes | 74/60 |
| 4,030,404 | 6/1977 | Meijer | 92/12.2 |
| 4,168,632 | 9/1979 | Fokker | 74/60 |
| 4,235,116 | 11/1980 | Meijer et al. | 74/60 |

OTHER PUBLICATIONS

Machine Design, Sep. 12, 1974, vol. 46, pp. 42–44.
Product Engineering, Apr. 1978, p. 119.
Product Engineering, Feb. 1979, inside rear cover.
Standard Handbook for Mechanical Engineers, McGraw-Hill, 7th Ed., pp. 8-55 and 8-56.

*Primary Examiner*—Kenneth Dorner
*Attorney, Agent, or Firm*—David R. Treacy

[57] ABSTRACT

A drive for a variable-stroke swash plate machine, comprising a rotatably journalled shaft and a swash plate mounted so that the plate cannot rotate with respect to the shaft during operation. The plate is journalled on the shaft so that it is rotatable about an axis of rotation which intersects the shaft axis at an acute angle. A first conical gear on the plate engages a second conical gear on a sleeve arranged coaxially around the shaft. Control means rotate the sleeve and second conical gear with respect to the shaft.

7 Claims, 4 Drawing Figures

DRIVE FOR A VARIABLE-STROKE SWASH PLATE MECHANISM

BACKGROUND OF THE INVENTION

The invention relates to a drive for a variable-stroke reciprocating engine, comprising a rotatably journalled shaft and a plate which is mounted thereon in such a manner that the plate cannot rotate with respect to the shaft during steady state operation, the plate being adjustable with respect to the shaft so that the angle between the plate and the shaft varies such a drive is sometimes referred to as a variable angle swash plate drive.

A drive of this kind is shown from U.S. Pat. No. 3,511,102. In this known drive, the plate is tiltable about a tilting axis which extends transversely of the shaft, the variation of the tilting of the plate being realized by means of rather complex mechanical means.

SUMMARY OF THE INVENTION

The invention has for its object to provide an improved and simpler construction of a control drive of the a variable-stroke swash plate.

The drive in accordance with the invention is characterized in that the plate is journalled on the shaft so that it is rotatable about an axis of plate rotation which intersects the shaft axis at an acute angle, the plate includes a first conical gear ring defining a conical surface through the pitch circle of the teeth which is coaxial with the plate axis of rotation, the cone apex being at the point where the plate axis of rotation intersects the shaft axis, the first gear ring engages a second conical gear ring provided on a sleeve which is arranged around the shaft, the conical surface through the pitch circle of the teeth of said second gear ring having the same apex as the conical surface associated with the first gear ring, and a smaller apex angle or an apex angle which faces the other side; and the drive includes control means for relatively rotating the sleeve and the second gear ring over a limited angle with respect to the shaft.

The sleeve with the second gear ring is locked with respect to the shaft during normal operation that is, they rotate together without any relative movement because of the effect of a hydraulic control described below. Because the first gear ring engages the second gear ring, the plate which is fixed to the first conical gear cannot rotate either with respect to the shaft in this situation. The angle enclosed by the plate and the shaft can then be varied by rotation of the sleeve with respect to the shaft in response to movement of the hydraulic control.

As a result, the second and the first gear ring, with the plate connected thereto, will also rotate with respect to the shaft, the plate rotating about the cone axis of the first gear ring. Further, the normal to the plate surface encloses an angle with the axis of plate rotation. During the rotation this normal describes a conical envelope around the axis of plate rotation, which means that the angle between plate surface and shaft varies, and hence the stroke of the pistons cooperating with the plate.

A further preferred embodiment of the drive in accordance with the invention is characterized in that the sleeve comprises at least two vanes which extend in the axial direction of the shaft and sleeve and which are enveloped in a sealing manner by an outer part which is connected to the shaft and whose side which faces the sleeve is also provided with two fixed vanes, a liquid inlet duct and an inlet outlet duct communicating with or opening into each one of two oppositely situated spaces between the vanes. The sleeve can thus be rotated with respect to the shaft by pumping more or less liquid into these spaces. This results in a very simple, compact construction for rotation of the sleeve which can be easily operated.

In a further preferred embodiment, the sleeve comprises a sun gear ring which engages one or more planet gear wheels which are connected to the shaft and which engage an internally geared gear wheel which is capable of rotating about the shaft axis and which is connected to an outgoing shaft of the drive.

Thus, the engine itself can deliver part of the torque required for adjustment of the plate.

In order to enable part of the energy required for adjusting the plate to be temporarily stored, the sleeve in a further preferred embodiment is connected to the shaft via an energy buffer.

The energy buffer may be formed by a torsion bar in accordance with the invention.

The invention will be described in detail hereinafter with reference to the accompanying diagrammatic drawing.

DESCRIPTION OF THE PREFERRED EMBODIMENTS

Figure 1:
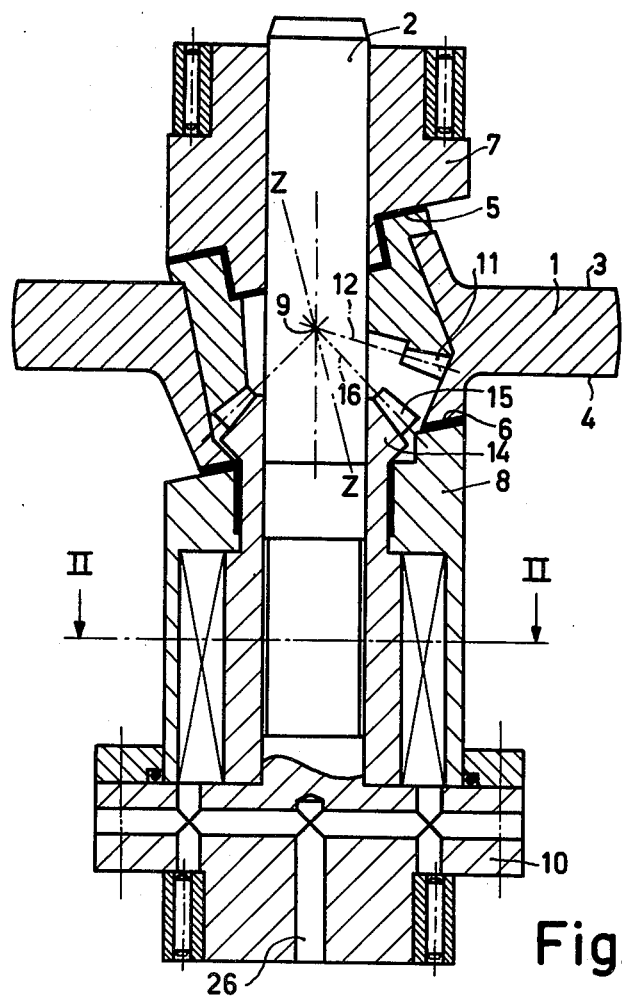
FIGS. 1 and 2 are two mutually perpendicular cross-sectional views of a drive comprising an adjustable plate.
Figure 2:
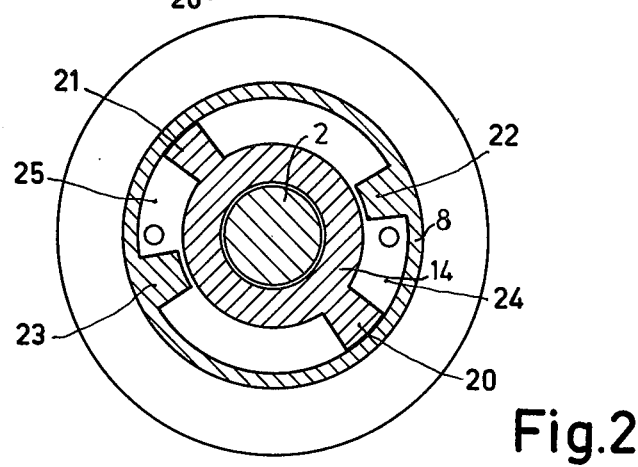

As shown in FIGS. 1 and 2 a plate 1 is provided on both sides with running faces 3 and 4 with which sliding shoes or other bearing means forming part of piston rods can cooperate. The plate 1 is journalled on parts 7 and 8 via bearings 5 and 6. The bearing arrangement is such that the plate 1 can rotate about the axis plate rotation ZZ. The axis of rotation ZZ intersects the axis of a shaft 2 at a point 9. The part 7 is rigidly connected to the shaft 2 by a shrink fit, and the outer part 8 is rigidly connected to a flange 10 of the shaft 2 by means of bolts. The plate 1 comprises a first conical gear ring 11. The envelope of cone 12 which extends through the pitch circle of the gear ring 11 has the axis of rotation ZZ as its cone axis and the point 9 as its apex.

Coaxial with the shaft 2 a sleeve 14 is mounted such that it can rotate around the shaft 2. The sleeve 14 is also provided with a second conical gear ring 15 which defines a cone 16 through the pitch circle, the cone having the center line of the shaft 2 as its cone axis, its apex also being situated at the point 9. The gear rings 11 and 15 mesh at one point.

On its side which is remote from the shaft 2, the sleeve 14 is provided with two vanes 20, 21. The outer part 8, connected to the shaft 2, is also provided with two fixed vanes 22, 23. A liquid inlet and outlet duct 26 opens into the spaces 24 and 25 between the vanes 20, 22 and 21, 23, respectively.

The operation of the described drive is as follows. When a rotational torque is exerted on the plate 1 by the piston rods (not shown), the plate 1 will start to rotate about the axis of the shaft 2. Because the conical gear rings 11 and 15 engage each other, during steady operation a rigid coupling exists between the plate 1 and the shaft 2, so that the shaft 2 rotates with the plate.

Conversely, when the shaft 2 is driven, the plate 1 will also start to rotate. The stroke of the pistons cooperating with the plate 1 can be varied by variation of the position of the plate 1 with respect to the shaft 2. This is realized by supplying pressurized liquid to the spaces 24 and 25 via the duct 26. As a result, the vanes 20, 22 and 21, 23 are moved apart and the sleeve rotates through a given angle with respect to the shaft 2.

When the sleeve 14 rotates about the shaft, the gear ring 15 also rotates and, because it engages the gear ring 11, the latter ring is also forced to rotate. Via the gear ring 11 the plate 1 is then also rotated around the axis of plate rotation ZZ. The normal to the plate surface encloses an angle with the axis ZZ, so that it describes a conical envelope around ZZ during the rotation; therefore, the angle enclosed by the plate 1 and the shaft 2 varies, and hence also the stroke of the pistons.

Figure 3:
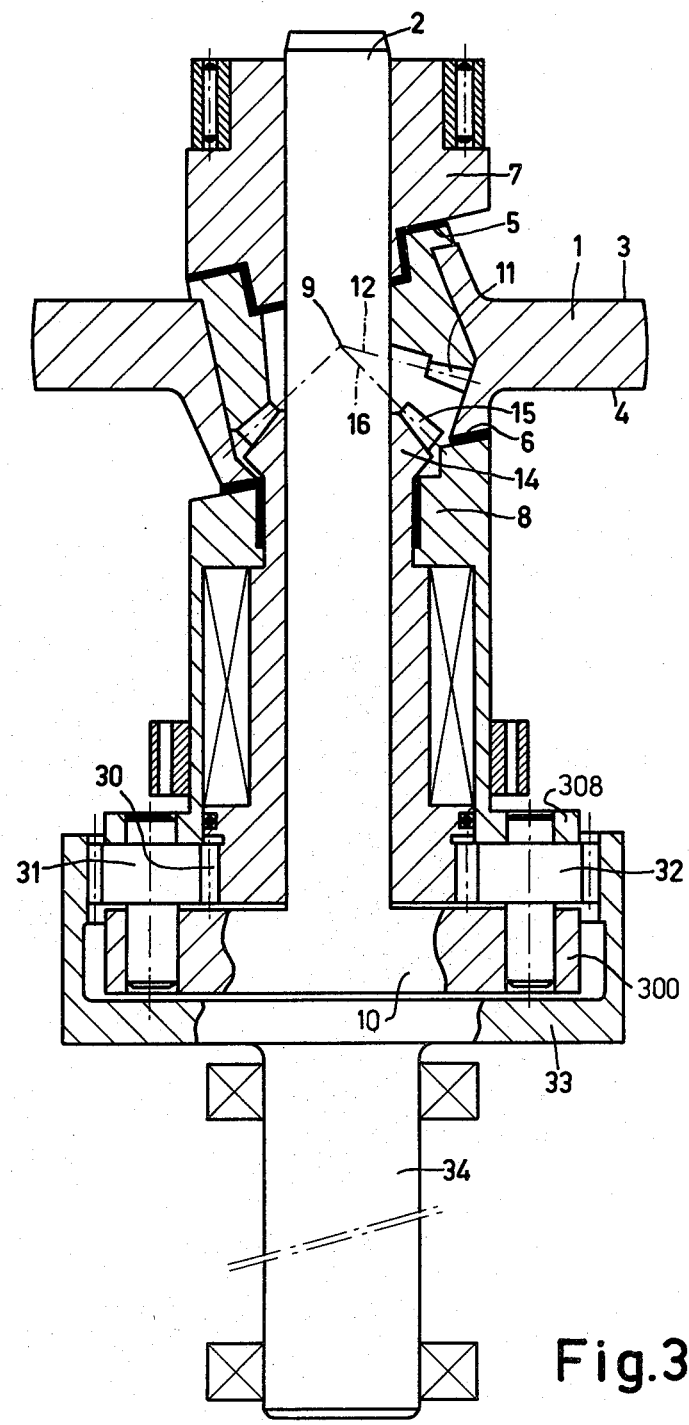
FIGS. 3 and 4 show two further embodiments of the drive.

FIG. 3 shows a slightly modified embodiment of the drive shown in FIG. 1 in which the sleeve 14 comprises a gear ring (sun gear) 30. This gear ring engages two planet gear wheels 31 and 32 which are arranged on shafts which are journalled in a flanged end 308 of the outer part 8 and an outer part 300 of the flange 10. The gear wheels 31 and 32 engage the internally geared wheel 33 which is arranged on a rotatably journalled shaft 34 which also constitutes the output shaft of the drive. In this embodiment, when the plate 1 is adjusted, i.e. when the part 8 and sleeve 14 rotate with respect to each other, the part 8 will lead the internal gear 33.

In that case, the sleeve 14 need deliver less energy. The sun gear 30 is subject to a torque of a value equal to the rotational torque exerted by the pistons (not shown) on the plate 1, multiplied by the quotient of the number of teeth of the gears 30 and 33. This torque, in conjunction with the torque exerted by the hydraulic pressure liquid on between the part 8 and sleeve 14 as shown in FIG. 2, provides adjustment of the plate during rotation in the direction of the rotational torque. Upon adjustment in the other direction, the tilting torque exerted on the plate by the pistons makes a contribution, and the hydraulic liquid and the shaft 34 will exert a braking effect.

Figure 4:
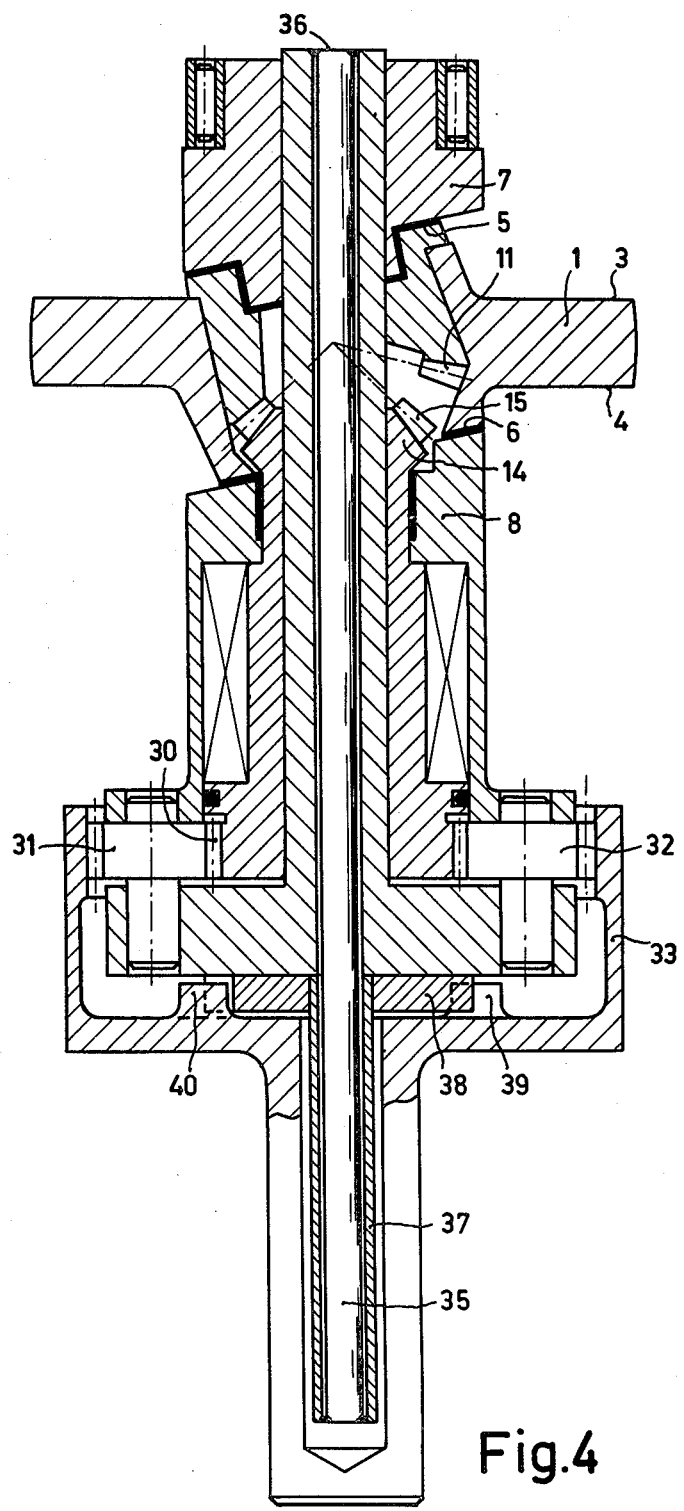

Because the shaft 2 rotates with respect to the output shaft 34, it is possible to store part of the required adjusting energy in a torsion bar. This is shown in FIG. 4. A torsion bar 35 is connected to the shaft 2 at the area 36. A torsion tube 37 is connected to the torsion bar 35. The tube 37 has connected to it a rod 38 which bears against abutments 39 and 40 which form part of the gear 33. As the angle between the plate 1 and the shaft 2 decreases, the pistons exert a torque on the plate in the direction in which adjustment takes place. This torque is larger than required for the adjustment. During this adjustment, the abutments 39 and 40 carry along the rod 38 and the torsion bar 37, 35 is twisted, so that energy is stored.

This stored energy can be used at a later stage when the plate 1 is to be adjusted against the rotational torque.

What is claimed is:

1. A drive for a variable-stroke swash plate mechanism comprising a rotatably journalled shaft and a plate mounted on the shaft such that the plate cannot rotate with respect to the shaft during steady state operation, the plate being adjustable with respect to the shaft so that the angle between the plate and the shaft can be varied, characterized in that
   the plate is journalled on the shaft so that it is rotatable about an axis of plate rotation which intersects the shaft axis at an acute angle,
   the plate comprises a first conical gear ring defining a conical surface through the pitch circle of the teeth, the cone axis being coaxial with said axis of plate rotation and the cone apex being located at the point where the axis of plate rotation intersects the shaft axis, and
   the drive further comprises a sleeve arranged coaxially around the shaft and having a second conical gear meshing with said first conical gear, a conical surface through the pitch circle of the teeth of said second gear having the same apex location as the conical surface defined by the first gear ring, and control means for locking or relatively rotating the sleeve and second gear with respect to the shaft.

2. A drive as claimed in claim 1, characterized in that the conical surface defined by the second gear has a smaller apex angle than the conical surface defined by the first gear.

3. A drive as claimed in claim 1, characterized in that the conical surface defined by the second gear has an apex angle facing the other side of the shaft from the conical surface defined by the first gear.

4. A drive as claimed in claim 1, 2 or 3, characterized in that said control means comprises at least two vanes connected to the sleeve and extending in the axial direction of the sleeve, and a part fixed to the shaft, enveloping said vanes in a sealing manner, and having at least two fixed vanes extending toward said sleeve, and liquid inlet and outlet duct openings communicating with spaces between said vanes.

5. A drive as claimed in claim 1, 2 or 3, characterized in that the drive further comprises a sun gear fixed to the sleeve, an internal gear wheel arranged for rotation about the shaft axis, at least one planet gear journalled to the shaft and meshing both with the sun gear and the internal gear, and an output shaft connected to the internal gear.

6. A drive as claimed in claim 1, 2 or 3, characterized in that the sleeve is further connected to the shaft by an energy buffer.

7. A drive as claimed in claim 6, characterized in that the energy buffer is a torsion bar.

* * * * *